UNITED STATES PATENT OFFICE.

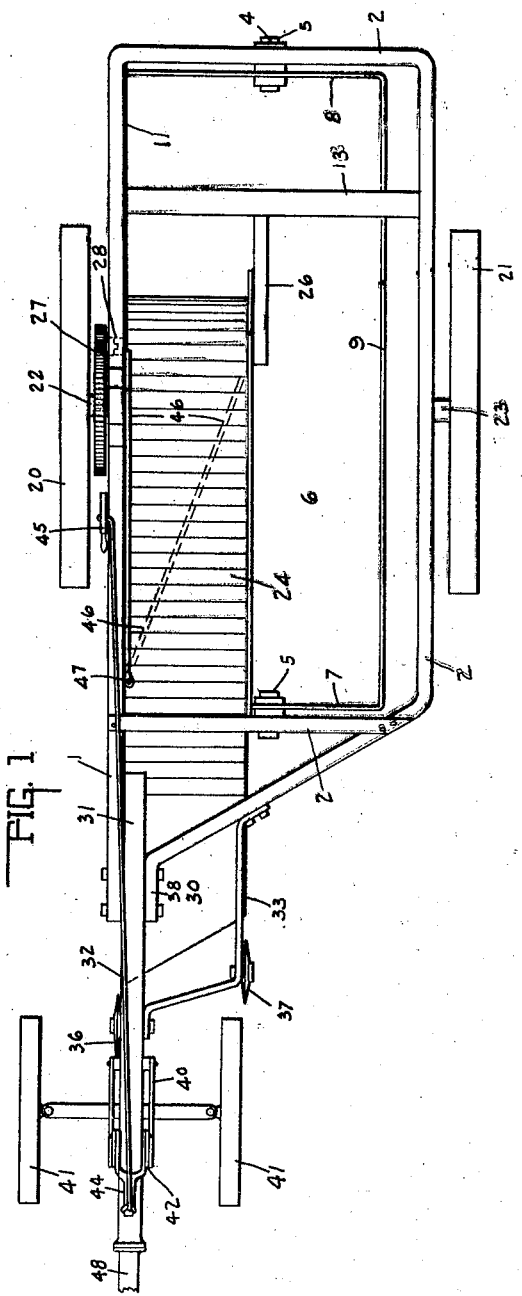
A. N. DAYWITT.
ROAD GRADER.
APPLICATION FILED JULY 17, 1919.
1,349,498.
Patented Aug. 10, 1920.
2 SHEETS—SHEET 1.
INVENTOR.
Albert N. Daywitt
BY
ATTORNEY.

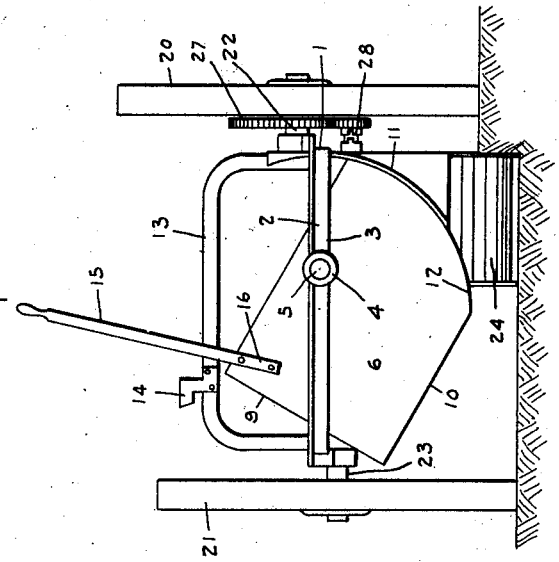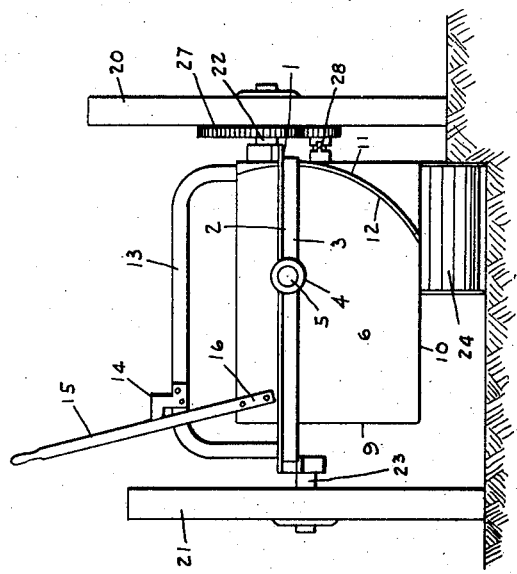

ALBERT N. DAYWITT, OF FRANKFORT, INDIANA.

ROAD-GRADER.

1,349,498.   Specification of Letters Patent.   Patented Aug. 10, 1920.

Application filed July 17, 1919. Serial No. 311,529.

*To all whom it may concern:*

Be it known that I, ALBERT N. DAYWITT, a citizen of the United States, residing at Frankfort, in the county of Clinton and State of Indiana, have invented certain new and useful Improvements in Road-Graders, of which the following is a specification.

This invention relates to road grading machines wherein earth is excavated from the road bed and carried away to be deposited at another point. It is among the objects of this invention to improve the prior devices so as to allow economical, rapid and effective cutting and removal of the earth from the road to be graded, and my invention results in a great saving in labor and power over that required by former machines of this kind.

In carrying the objects of my invention into effect I provide a frame mounted on a longitudinal beam and carrying a receptacle, preferably pivoted, and means are provided for cutting and loading earth thereon and for dumping same wherever desired.

My invention includes a stationary cutter or plow having one edge forwardly of the other and a set of disk cutters coöperating therewith to cut earth, and a mechanism is provided to raise the cutters above the level of the ground while the machine is on its way to the dump. A conveyer receives the earth cut by the cutters and deposits the same in the receptacle and the driving means is directly connected with the machine proper by a rigid connection which includes no jointed members.

In the accompanying drawings, which illustrate a specific embodiment of my invention, Figure 1, is a top view of my improved grading machine, Fig. 2, illustrates a side view, and Figs. 3 and 4 partial end views showing more especially the dumping receptacle in both locked and dumping positions.

A longitudinal beam 1 has mounted upon it along one side a frame work 2. Pivots 4 and 5 are provided in said frame work and serve to pivotally hold a receptacle 6 comprising ends 7 and 8, side 9 and bottom 10 which move on the pivot. The side 11 of the receptacle is fixed to the frame and does not move. The lower portion of side 11 is formed in a slope 12 in order that no dirt may accumulate at that point. An arched bar 13 is connected to the frame and serves as a seat for spring member 14 which coöperates with the lever 15 fixed to receptacle 6 at 16 to hold the receptacle in its normally closed position and to allow of moving the lever to dump the receptacle.

Wheels 20 and 21 are attached to the frame 2 by pivots 22 and 23, the pivot 22 adjacent the beam 1 being at a level considerably above pivot 23, the wheels 20 and 21 being of approximately the same size. An endless conveyer belt 24 runs from the ground at the forward end of the frame up to practically the top of the receptacle at its rear end, and runs over a roller 25 pivoted to the frame at 26, the roller 25 being meshed with wheel 20 by a set of gearing 27, and a clutch 28 is provided so that the belt 24 may be thrown in and out of gear.

The belt runs over lower roller 29 in close proximity to a plow member 30 which is attached to the longitudinal beam by a member 31 and has its edge 32 directly beneath the beam 1 and forwardly of its other edge 33. A downwardly extending arm 35 fixed to the longitudinal beam carries disk cutters 36 and 37 which are placed forwardly of the stationary cutter 30 and in line with its parallel lateral edges 32 and 33.

To beam 1 is rigidly secured at 38 a bar 39 which may be made integral with beam 1 and has pivotally attached to it at point 40 a set of wheels 41. A toggle arrangement 42 is connected to the wheels and pivoted on bar 39 at point 43 and a lever 44 connected to the same extends back to an operating lever 45. A directing member, such as a bar 46 pivoted to the frame at 47 may be moved across conveyer 24 so as to direct the incoming earth to any part of the receptacle 6. The machine is operated by a driver who sits in seat 50, operates the levers 15 and 45, the bar 46 and the clutch member 28, and also drives the horses which are attached to the forward end 48 or operates a tractor at the same point.

The operation of the machine is as follows:

The toggle joint 42 is in the position shown in Fig. 2, the receptacle being in its normally closed position, driving means are applied and the stationary cutter 30 coöperating with disk cutters 36 and 37 easily remove a large section of earth from the road bed with the expenditure of but little power due to the absence of a mold board, and due to the fact that one of the edges 32, is placed forwardly of the other edge and to the parallel sides of the stationary cutter and the coöperation of the disk cutters. The earth which is pushed rearwardly falls on the conveyer 24 and is drawn up into the front portion of the receptacle 6, the clutch 28 having been previously thrown in and the bar 46 placed diagonally. When the front portion of the receptacle has been filled the driver gradually shifts bar 46 over until the rear portions of the receptacle are filled with the earth which is directed into the same by the bar.

Lever 45 is then pulled in order to straighten out the toggle 42—43 which has a stop member thereon (not shown) to hold the two links 42 and 43 of the toggle in the same straight line. The forward part of the machine is raised thereby and the cutters 30, 36 and 37 are raised off of the ground. The clutch 28 is then thrown out, the machine is driven to the dump, and the lever 15 is disengaged from member 14 and thrown over to dumping position, as shown in Fig. 4. After the load is dumped the lever is returned to its original position and the machine driven back to the road when lever 45 is thrown forwardly to engage the cutters, the clutch thrown in, and the operation is repeated.

The wheels 20 and 21 will be seen on different levels. By providing such an arrangement the cutters are enabled to cut a substantially horizontal section of the road bed and thus in a measure form a completed road bed after the desired amount of grading has been performed. Of course during the first two or three cuts along the length of the road wheels 20 and 21 will be on the same level and first few cuts will not be horizontal. By this machine I am enabled to cut the road to within about one foot of the bank whenever such a situation arises.

Having thus fully described my said invention, what I claim as new and desire to secure by Letters Patent, is:

1. A road grading machine comprising a frame mounted on wheels, a receptacle pivotally mounted therein, means for cutting earth, and means comprising a conveyer driven by the rotation of said wheels for elevating said earth into said receptacle, and means for distributing the earth to various parts of said receptacle.

2. A road grading machine comprising a frame mounted on wheels, a receptacle pivotally mounted therein, means for cutting earth, means comprising a conveyer driven by the rotation of the wheels for elevating said earth into said receptacle, and means for distributing earth to various parts of said receptacle, comprising a pivoted bar adapted to be shifted diagonally across said conveyer.

3. A road grading machine comprising a frame mounted on wheels, a receptacle pivotally mounted thereon, means for cutting earth comprising a stationary cutter having one longitudinal edge extending forwardly of the other, a plurality of disk cutters placed forwardly of and in line with the lateral edges of said stationary cutter, and means for elevating said earth into said receptacle.

4. A road grading machine comprising a longitudinal beam, a frame fixed to one side thereof and mounted on wheels, the wheel adjacent to said beam being pivoted at a higher level than the other wheel, a receptacle pivotally mounted in said frame, means for dumping said receptacle, a conveyer mounted in said receptacle, means on the wheel adjacent said beam for driving said conveyer, means for disengaging said conveyer from said wheel, means for cutting earth, a set of wheels mounted on the forward end of said beam, and means for raising the forward portion of said beam to raise the cutting means.

5. In a road grading machine a longitudinal beam, earth cutting and removing mechanism fixedly mounted thereon, means for applying driving means directly to said mechanism, a set of wheels mounted on the forward end of said beam, and toggle means coöperating with said wheels for raising said forward end to raise said cutting mechanism.

6. In a road grading machine earth cutting means comprising a stationary cutter having one longitudinal edge forwardly of the other, the lateral edges of said cutter being substantially parallel, and a plurality of disk cutters placed forwardly of and in line with the lateral edges of said stationary cutter.

7. In a road grading machine a longitudinal beam, earth cutting means comprising a stationary cutter having one longitudinal edge in front of the other, said forward edge being substantially directly below the said longitudinal beam, and plurality of disk cutters placed forwardly of and in line with the lateral edges of said stationary cutter.

8. In a road grading machine a longitudinal beam, a frame fixed to one side thereof, wheels mounted on said frame and beam, the wheel adjacent said beam being pivoted at a higher level than the other wheel.

9. In a road grading machine a longitudinal beam, a frame fixed to one side thereof, wheels mounted on said frame and beam, a receptacle comprising a side, bottom and ends pivoted in said frame, the center of gravity being such as to cause the receptacle to assume a closed position, a member constituting the other side of said receptacle fixed to said frame, means for inverting said receptacle to dump its contents, and means for locking said receptacle in closed position.

In witness whereof I have hereunto set my hand and seal at Indianapolis, Indiana, this 14th day of July, A. D. nineteen hundred and nineteen.

ALBERT N. DAYWITT. [L. S.]

Witnesses:
H. C. BINMAN,
M. L. SHULER.